(12) United States Patent
Chen

(10) Patent No.: US 6,433,516 B1
(45) Date of Patent: Aug. 13, 2002

(54) TEMPERATURE STABILIZED CONSTANT CURRENT SOURCE SUITABLE FOR CHARGING CHARGE DEPLETED BATTERY WITH SINGLE POWER SUPPLY

(75) Inventor: Sean S. Chen, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/879,474

(22) Filed: Jun. 11, 2001

(51) Int. Cl.[7] .................................................. H02J 7/16
(52) U.S. Cl. ...................................................... 320/150
(58) Field of Search ................................ 320/150, 151, 320/152, 153

(56) References Cited

U.S. PATENT DOCUMENTS

| | | | |
|---|---|---|---|
| 4,061,956 A | * 12/1977 | Brown et al. | 320/146 |
| 5,633,574 A | * 5/1997 | Sage | 320/107 |
| 6,225,787 B1 | * 5/2001 | Chen et al. | 320/150 |

* cited by examiner

*Primary Examiner*—Gregory Toatley
(74) *Attorney, Agent, or Firm*—Beyer Weaver & Thomas LLP

(57) ABSTRACT

A temperature stabilized, constant current source capable of charging a fully discharged battery of the present invention includes a feedback control stage that provides a substantially constant battery charging current at a particular temperature. A temperature stabilized current source stage coupled to a bias resistor includes a negative temperature coefficient current source that provides a countervailing control current to a positive temperature coefficient current source that is coupled from a sensing resistor. The temperature dependencies of the positive and negative temperature coefficient current sources tend to cancel each other out so as to provide a temperature stabilized current to the sensing resistor. The bias resistor provides a bias current to the temperature stabilized current source stage in such a way that the temperature stabilized current source stage provides a charging current to a fully discharged battery.

12 Claims, 6 Drawing Sheets

TEMPERATURE STABILIZED CONSTANT CURRENT SOURCE SUITABLE FOR CHARGING CHARGE DEPLETED BATTERY WITH SINGLE POWER SUPPLY

BACKGROUND OF THE INVENTION

This invention relates generally to analog integrated circuits, and more particularly to current sources implemented in analog integrated circuits.

Constant current sources and constant voltage sources are used for a variety of purposes in analog integrated circuits. As used herein, "constant" means that the output of the source remains at a relatively constant direct current (d.c.) level, although the output levels of such sources can typically be adjusted ("set") with a control signal. Once set, the output of a constant current or voltage source may change with temperature (i.e. be "temperature dependent") or may be stable with temperature. In many applications, it is desirable to have a constant current or voltage source that does not vary in output as the temperature changes. If the output of a constant, temperature stable, current source is coupled from an output resistor that is temperature stable, the result is a constant, temperature stable voltage source, as will be appreciated by those skilled in the art. These constant, temperature stable voltage sources are useful for many purposes, such as providing a reference voltage, for adjusting the threshold of a comparator, etc. that are useful power supplies for charging a battery Unfortunately, however, conventional battery chargers are not capable of charging batteries that have been discharged below approximately 2.5 to 3.0 volts. One approach to charging batteries below 2.5 to 3.0 volts to a range of approximately 1.0 volt is described in U.S. Pat. 6,225,787 B1 issued to Chen et. al. entitled "TEMPERATURE STABILIZED CONSTANT CURRENT SOURCE SUITABLE FOR CHARGING A HIGHLY DISCHARGED BATTERY". Unfortunately, the approach described in the '787 patent is incapable of charging batteries that are fully depleted, i.e., in the range of 0.0 volts since the temperature stabilized constant current source described therein requires at least 1.0 volt battery voltage in order to generate an appropriate and sufficient battery charging current Therefore, what is desired is a temperature stabilized, adjustable, yet constant current source suitably arranged to charge a battery that has been discharged to as low as 0.0 volts.

SUMMARY OF THE INVENTION

The invention is an electrical circuit that provides a temperature stabilized current source with a stable control voltage capable of charging a battery having been discharged to as low as approximately 0 volt. As used herein, "stable" means that the voltage remains essentially unchanged with changes in temperature, i.e. it is not temperature dependent. The circuit solves the problem of providing an adjustable temperature stabilized current source suitable for charging fully discharged (i.e. in the range of 0.0V) batteries.

The temperature stabilized, constant current source battery charger suitable for charging a fully discharged battery includes a current based feedback control circuit responsive to small signal changes in a battery charging current wherein the feedback control circuit maintains the battery charging current within a predetermined range of current values at a particular operating temperature. A temperature compensation circuit coupled from the feedback control circuit that is responsive to a temperature change having a sensing resistor of a given resistor technology coupled from at least one positive temperature coefficient voltage source and at least one negative temperature coefficient current source arranged to provide said sensing resistor with a temperature stabilized control current such that temperature dependencies of the negative temperature coefficient current source substantially countervails the at least one positive temperature coefficient voltage source such that a sense voltage developed by the sensing resistor is substantially constant over a predetermined operating range of temperatures. The current source further includes a bias resister coupled to the temperature compensation circuit arranged to provide a bias current to the temperature compensation circuit based upon a supply voltage such that the temperature compensation circuit is operative when the battery is fully discharged.

As a method for providing a temperature independent current suitable for charging a fully discharged battery, a battery charging current is maintained to the battery within a specified range of battery charging currents using a feedback control circuit and a bias resistor. The feedback controlled battery charging current is further temperature stabilized over a range of operating temperatures by a temperature stabilized current source having positive temperature coefficient current source and a countervailing negative temperature coefficient current source that maintains a temperature stabilized current through a sensing resistor. The bias resistor provides a bias current based upon a supply voltage to the temperature stabilized current source so as to provide a battery charging current to a fully discharged battery.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

Figure 1:
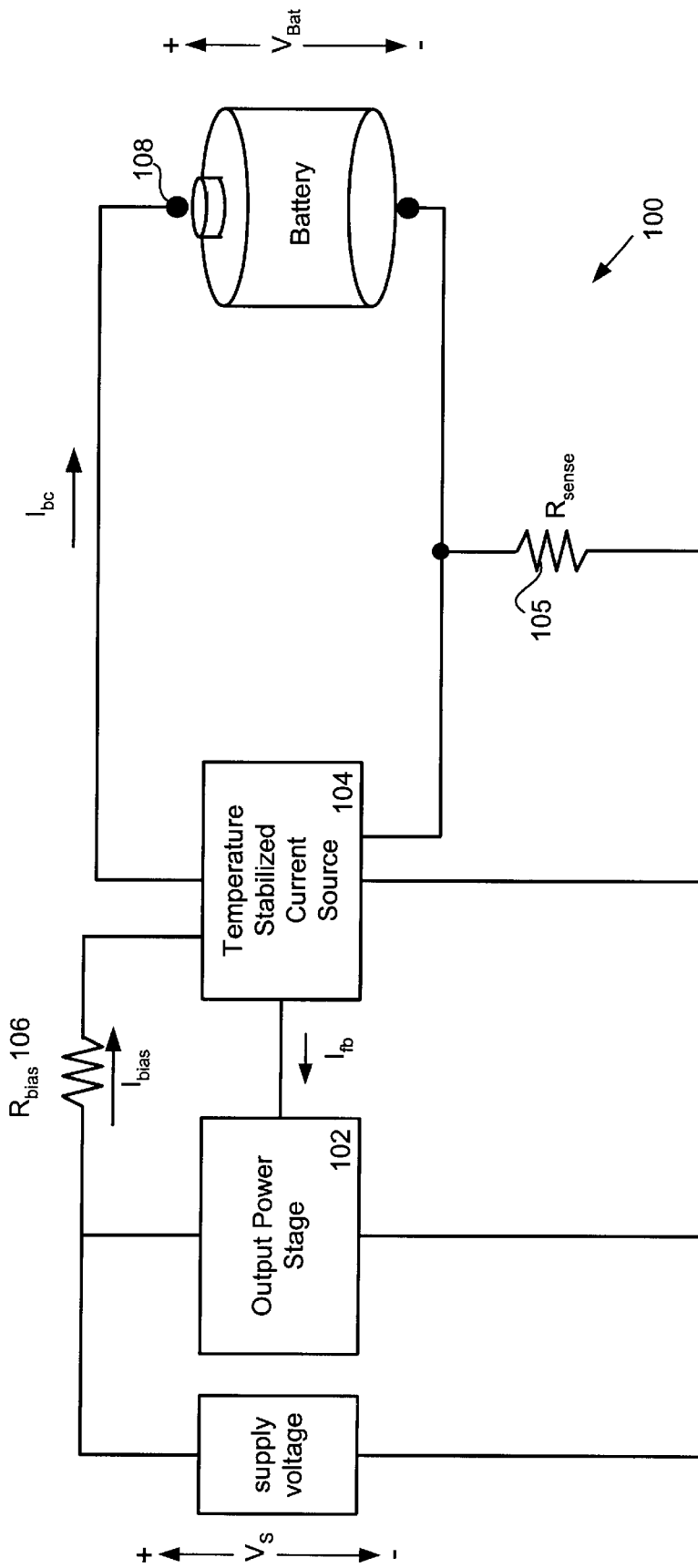
FIG. 1 is a block diagram of a temperature-stabilized, constant current source in accordance with the present invention.
Figure 2A:
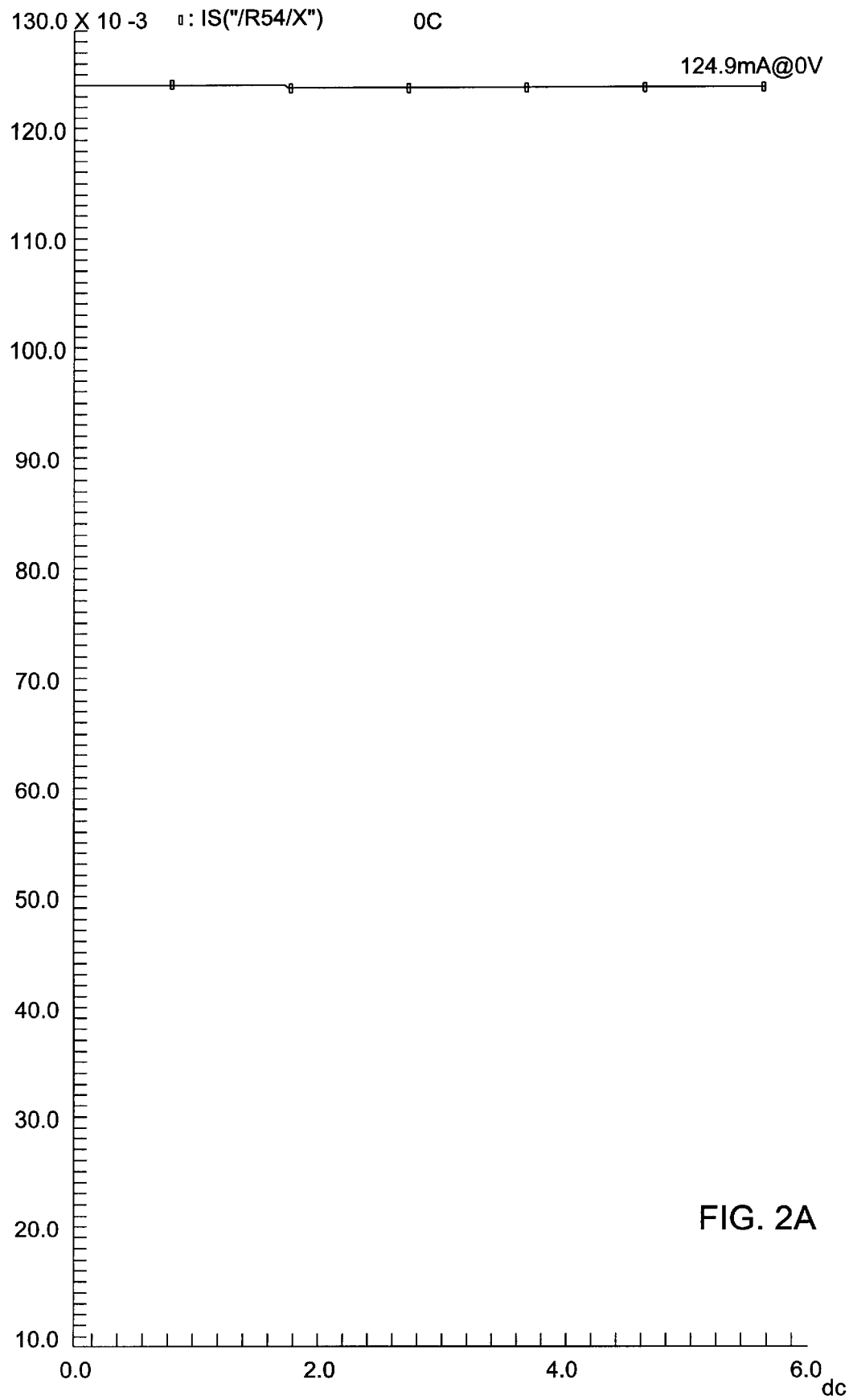
FIGS. 2A–2D are graphical representations of an output current versus output voltage over a selected temperature range for a particular implementation of the invention.
Figure 2B:
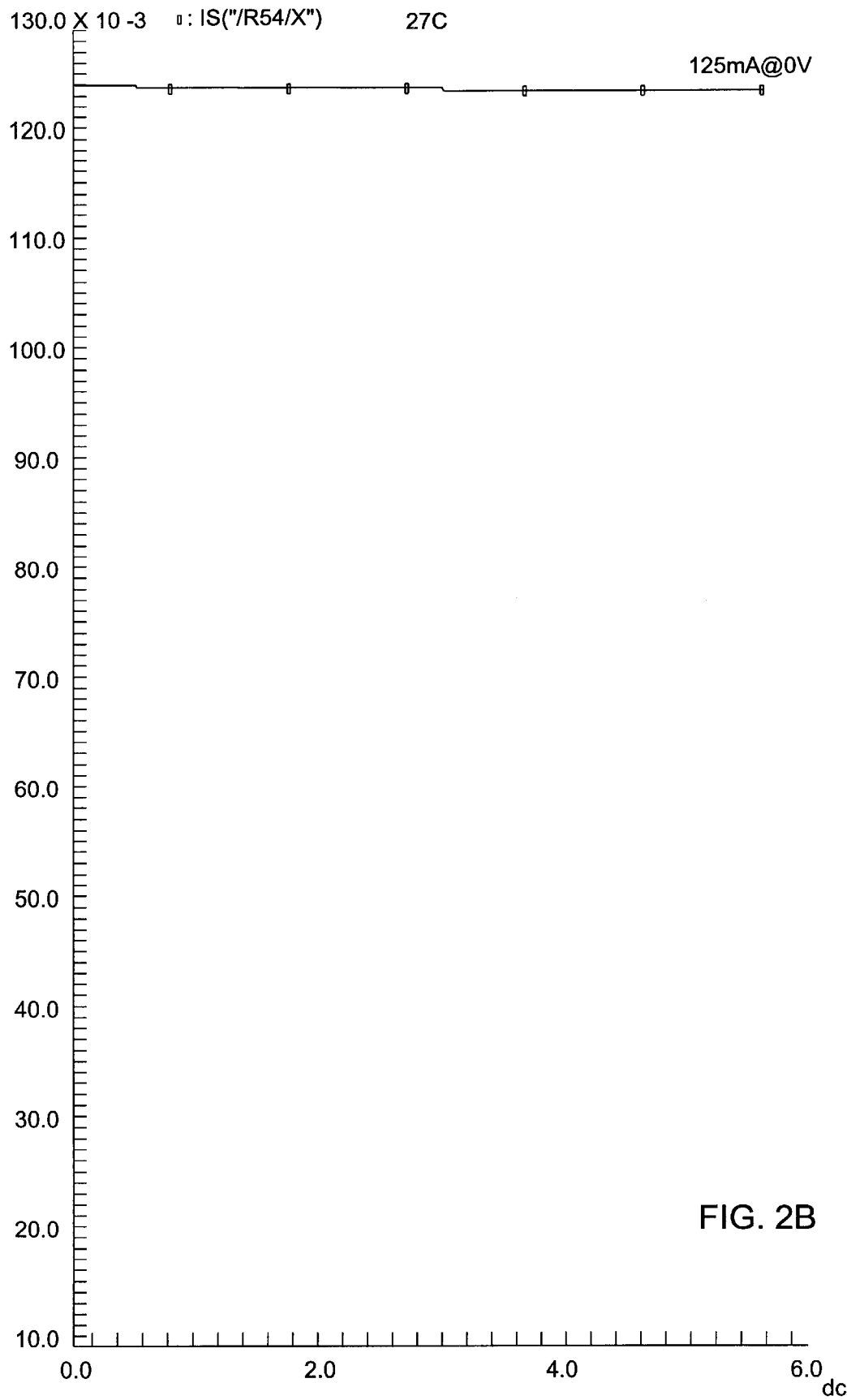
Figure 2C:
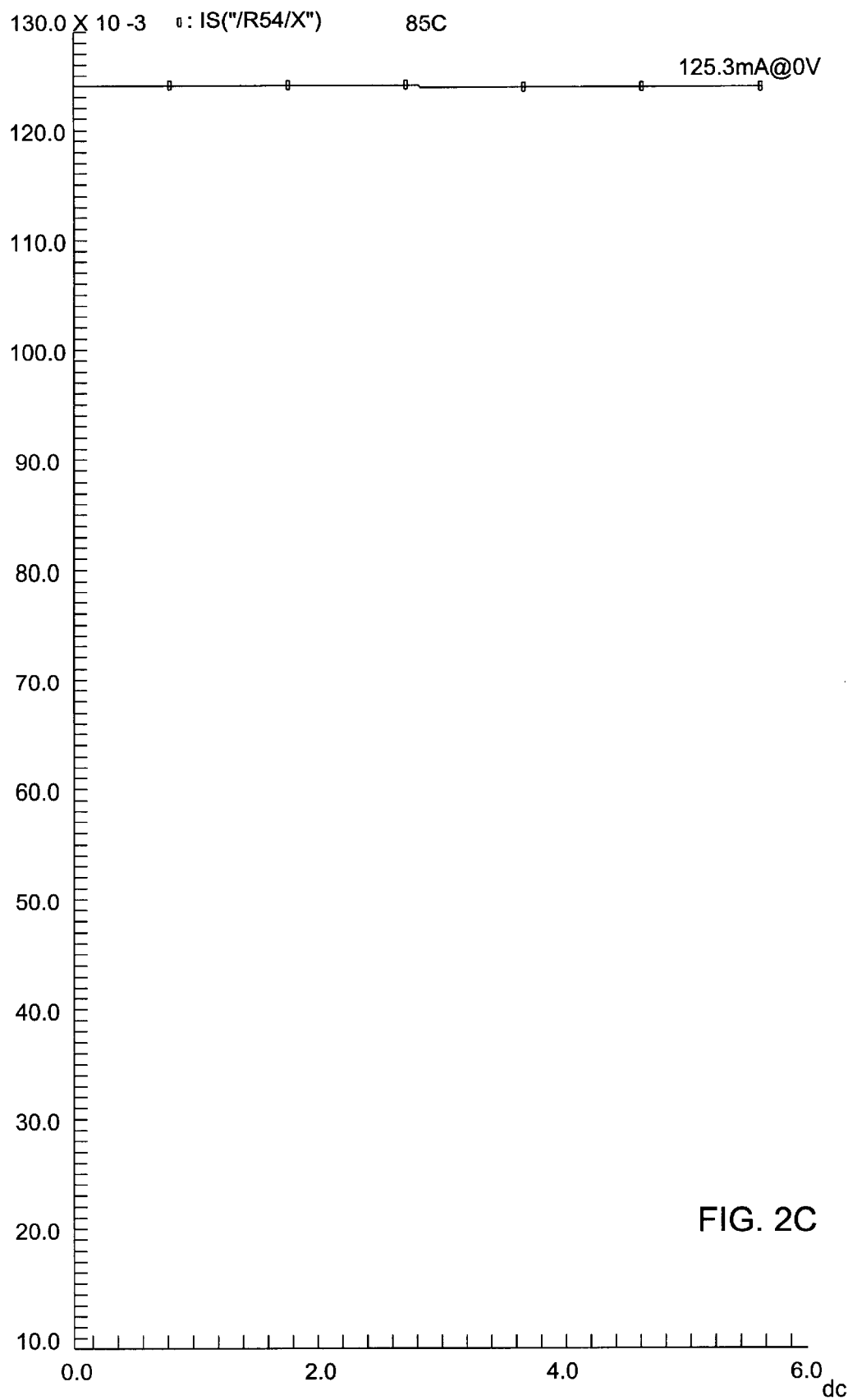
Figure 2D:
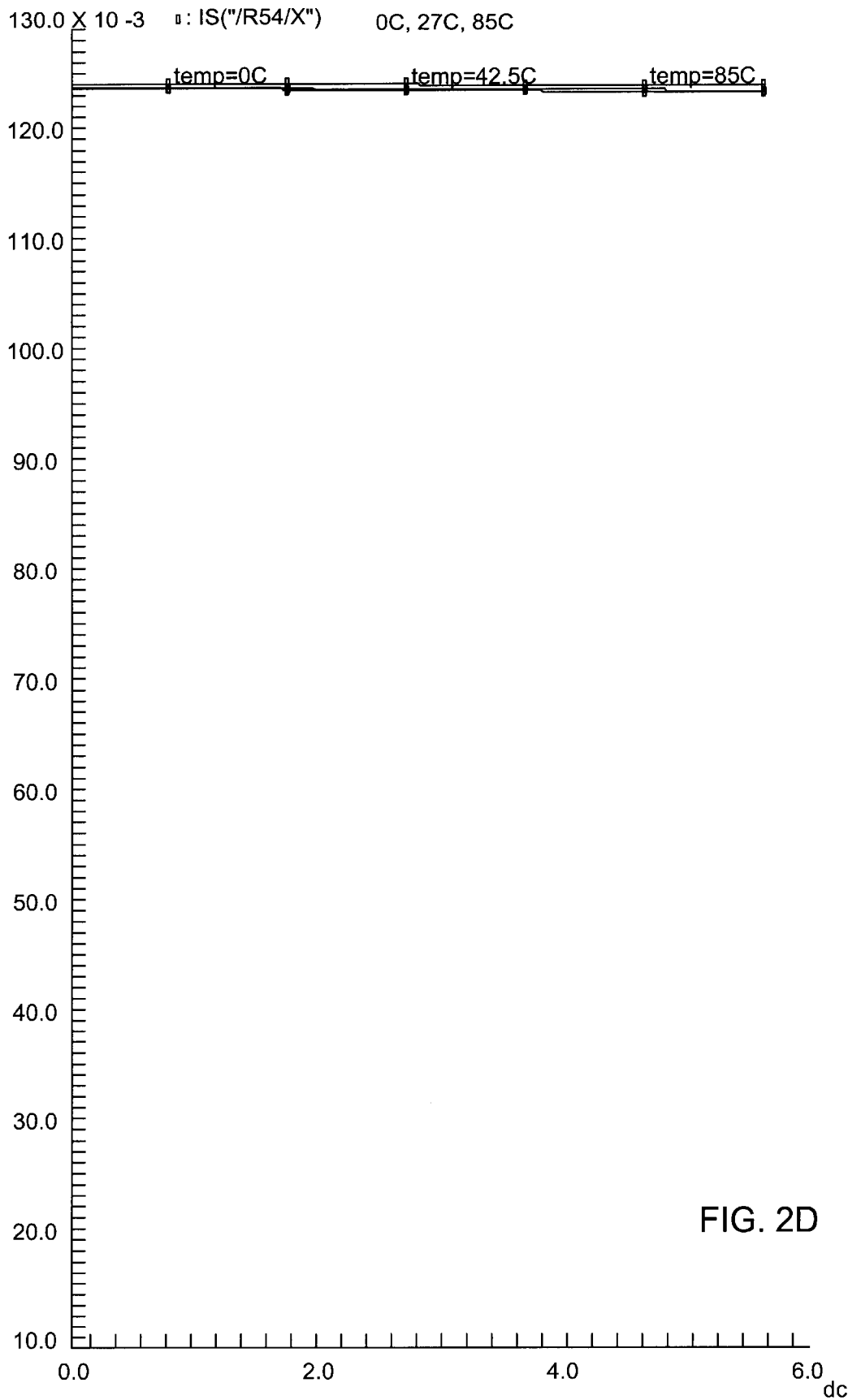

In FIG. 1, a temperature-stabilized, constant current source battery charger 100 in accordance with the present invention, includes a first stage 102 in the form of a feedback control circuit coupled from a second stage 104. In the described embodiment, the second stage 104 takes the form of a temperature stabilized current controlled source circuit 104 that uses a voltage developed by a sensing resistor $R_{sense}$ 105 to compensate for any change (i.e., increase or decrease) in ambient temperature. A bias resistor $R_{bias}$ 106 passes a bias current $I_{bias}$ to the temperature stabilized current controlled source circuit 104 that includes those situations where a battery 108 coupled thereto is fully charge depleted (also referred to as discharged) such that a battery voltage $V_{Bat}$ is in the range of 0.0 volts.

In the described embodiment, at a particular ambient temperature, the output power stage 102 maintains a substantially constant battery charging current $I_{bc}$ by producing a feedback current signal in proportion to any deviation (i.e., an increase or a decrease in $I_{bc}$) of a nominal battery charging current $I_{bc}$ through the battery 108. During operation, the output power stage 102 in combination with the bias resistor $R_{bias}$ 106 provides the current necessary to maintain the battery charging current $I_{bc}$ at its nominal value even in those situations where the battery 108 is fully charge depleted. It should be noted that by fully charge depleted it is meant that the battery 108 is discharged such that the battery voltage $V_{Bat}$ is in the range of substantially zero (0.0) volts. For example, in those situations where the $V_{Bat}$ is substantially zero, the bias current $I_{bias}$ is supplied to the control circuit 104 so as to be operative when the battery is fully depleted. In the described embodiment, a typical value of $R_{bias}$ is approximately 8 K ohms with a 10 volt power supply which provides about 1 mA to the control circuit 104.

In those situations where there is a change (either an increase or a decrease) in ambient temperature, the temperature stabilized current source circuit 104 maintains a substantially constant battery charging current $I_{bc}$ by, in a preferred embodiment, maintaining a constant voltage ($V_{sense}$) across the sensing resistor $R_{sense}$ 105. In this way, the temperature stabilized current source circuit 104 is able to maintain a constant battery charging current $I_{bc}$ over a wide range of ambient temperatures. In a preferred embodiment, the temperature stabilized current source circuit 104 utilizes a negative temperature coefficient current source to compensate for any positive temperature coefficient current sources in order to maintain a constant sensing current $I_s$ through the sensing resistor 105. In this way, the battery charging current $I_{bc}$ to the battery 108 is stable over any contemplated range of operating temperatures.

Figure 3:
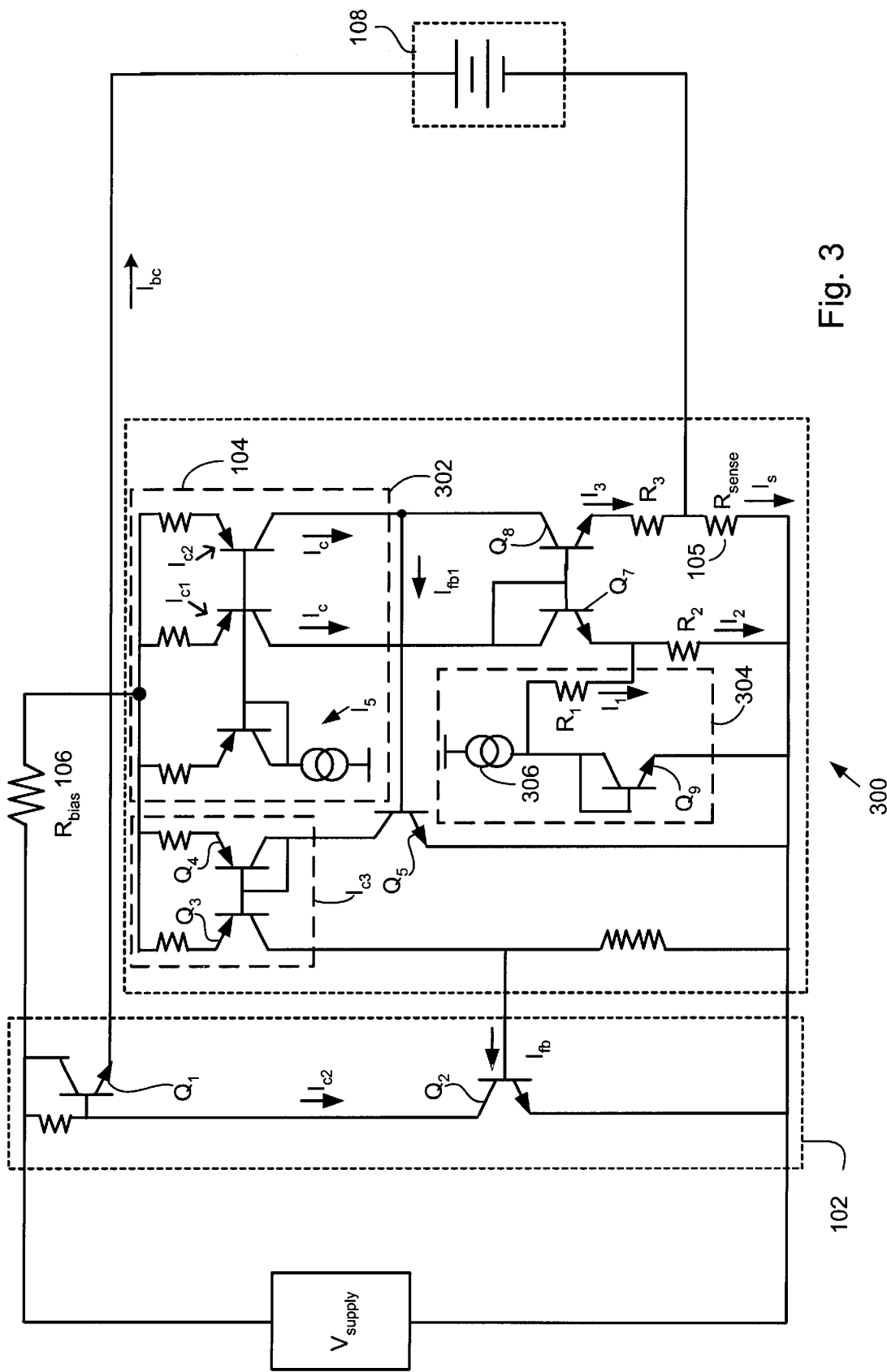
FIG. 3 is a circuit diagram of a temperature-stabilized, constant current source of the present invention that can be used in the circuit of FIG. 1.

FIG. 3 illustrates a circuit diagram 300 of one embodiment of the battery charging circuit 100 in accordance with an embodiment of the invention. As shown, the output power stage 102 includes transistors labeled $Q_1$ and $Q_2$. In this preferred embodiment, the transistors $Q_1$–$Q_2$ are bipolar NPN transistors. The design and fabrication of bipolar transistors that are commercially available is well known to those skilled in the art.

The temperature stabilized current source circuit 104 also includes a number of current sources. More particularly, the temperature stabilized current source circuit 104 includes a matched dual current source 302. The matched dual current source 302 includes a first current source $I_{c1}$, a second current source $I_{c2}$, and a biasing current source $I_5$. A gain stage $I_{c3}$ provides a feedback current $I_{fb}$ to the transistor $Q_2$ included in the output power stage 102. In addition, a capacitor $C_1$ having a capacitance of approximately 400 nf is coupled between the collector and base of the transistor $Q_2$. For example, at a particular operating temperature, if a nominal battery charging current $I_{bc(nominal)}$ increases by an amount $\Delta I_{bc}$, such that the battery charging current $I_{bc}$ is increased to ($I_{bc(nominal)}+\Delta I_{bc}$), a first feedback current $I_{fb1}$ also increases. The increase in feedback current $I_{fb}$) increases the base drive of an NPN transistor Q5 which increases the base drive of a PNP transistor $Q_3$. The increase in the base drive of the PNP transistor Q3 results in an increase in the base drive ($I_{fb2}$) of the NPN transistor $Q_2$ which results in an increase in the transistor $Q_2$ collector current $I_{c2}$ which pulls the collector of transistor $Q_2$ and the base of the transistor $Q_1$ low. In the described embodiment, the increased collector current $I_{c2}$ has the effect of reducing the base drive of the NPN transistor $Q_1$. In a preferred embodiment, the decrease in the base drive of the transistor $Q_1$ causes the increased battery charging current ($I_{bc}$ $_{(nominal)}+\Delta I_{bc}$) to be reduced by $\Delta I_{bc}$ thereby returning the battery charging current $I_{bc}$ to its nominal value $I_{bc(nominal)}$. It should be noted that when the battery charging current $I_{bc}$ decreases, the feedback circuit 102 will increase the battery charging current $I_{bc}$ to its nominal value $I_{bc(nominal)}$. In a preferred embodiment, the emitter area of the transistor $Q_8$ is approximately 10 times that of the transistor $Q_7$ which gives a $\Delta V_{be}$ of approximately 60 mV. In this way, the active base emitter turnon voltage of the transistor $Q_8$ (i.e., $V_{be, (Q8)}$) is approximately 600 mV whereas the active base emitter turnon voltage of the transistor $Q_7$ ($V_{be\ (Q7)}$) is approximately 660 mV.

As is well understood in the art, when the temperature of an NPN bipolar transistor increases, the $\Delta V_{bc}$ of $Q_7$ and $Q_8$ will also increase. Therefore, as the temperature of the battery charging circuit 100 changes, the current through the sensing resistor $R_{sense}$ 105 will also change if it were not compensated with the present invention, resulting in a correspondingly undesireable change in the battery charging current $I_{bc}$.

With a zero temperature coefficient sensing resistor $R_{sense}$ the combined positive temperature coefficient exhibited by the $\Delta V_{be}$ of the transistors $Q_7$ and $Q_8$ is substantially compensated for by a negative temperature coefficient current source 304. In the described embodiment, the current source 304 includes a biasing circuit 306 (typically in the form of a IPTAT) coupled from a resistor R1 and a transistor $Q_9$ having its collector tied to its base to form a $V_{be}$ dependent diode. The emitters of the transistor $Q_7$ and $Q_8$ are coupled to both the resistor $R_1$ and the resistor $R_2$. In the described embodiment, the base of the transistor $Q_8$ is coupled to the base of the transistor $Q_7$ having its emitter coupled to a resistor R3 that is in turn coupled from the sensing resistor ($R_{sense}$) 105. It should be noted that the transistors $Q_7$ and $Q_8$ are preferably NPN transistors where the transistor $Q_8$ has a larger emitter area than the transistor $Q_7$. Typically, the ratio of the emitter areas of the transistors $Q_8$ to $Q_7$, is in the range of approximately 2.0 to approximately 16.0 (i.e., when the device size of the transistor $Q_8$ is twice the size of the transistor $Q_7$, the ratio is 2.0).

During operation, in order to maintain a temperature stabilized battery charging current $I_{bc}$, the sensing current $I_s$ through the sensing resistor 105 must remain substantially temperature stabilized. In this way, a constant battery charging current $I_{bc}$ is maintained through the battery 108 across any contemplated range of operating temperatures.

The operation of the constant current source circuit 104 of the present invention will now be discussed in greater detail. As shown, the current source 304 provides a current $i_1$ through the resistor $R_1$.

The equations for the currents in transistors are:

$$(i_2+i_1)*R_2+V_{be(Q7)}-V_{be(Q8)}-i_3*R_3-(I_s+i_3)R_s=0 \quad \text{(Equation 1)}$$

by setting $$R_2=R_3 \quad \text{(Equation 2)}$$

and $$i_2=i_3 \text{ and assuming } i_3 \ll I_S, \text{ and } I_{bQ7} \ll I_e \quad \text{(Equation 3)}$$

Then:

$$\Delta V_{sense}=[V_{be(Q7)}-V_{be(Q8)}]-i_1*R_2 \quad \text{(Equation 4)}$$

or, $$\Delta V_{sense}=\Delta V_{be}+i_1*R_2 \quad \text{(Equation 5)}$$

Since $i_1$ (delivered by the current source 304) is set by resistors $R_1$ and $R_2$, then by selecting appropriate resistor values $R_1$ and $R_2$ such that $$i_1 * R_2 \text{ is approximately equal to } \Delta V_{be} \quad \text{(Equation 6)}$$

or more precisely $$T.C. \text{ of } (i_1 * R_2) = -T.C. \text{ of } (\Delta V_{be}) \quad \text{(Equation 7)}$$

then $V_{sense}$ has zero temperature coefficient. In this way, for example, when $\Delta V_{be}$ increases by 10 millivolts, for example, then $i_1 * R_2$ will decrease by 10 millivolts thereby maintaining a constant current $I_s$ through the sensing resistor $R_{sense}$ 105.

The actual value for the various components in battery charging circuit 100 are dependent upon the application of the circuit, as will be appreciated by those skilled in the art. Typically, $V_{supply}$ is in the range of approximately 7.0 to 10.0 volts and the current sources $I_{c1}$ and $I_{c2}$ can be, for example, 10 or 100 microampere current sources, whereas the sensing resistor 105 can be, for example, approximately 1 ohm whereas the bias resistor $R_{bias}$ can be in the range of 8 K ohms.

It should be noted that it is contemplated that both $R_{bias}$ and $R_{sense}$ are ideal zero temperature coefficient type resistors. However, if the sense resistor $R_{sense}$ has a positive or negative temperature coefficient, it can be compensated by changing the ratio of resistors $R_1/R_2$. For the proper operation of the present invention, the matched dual current sources $I_{c1}$ and $I_{c2}$ rely on good matching in ratio of resistors $R_1$ and $R_2$. As will be appreciated to those skilled in the art, there are many types of resistor technologies (also referred to herein as resistor "types") that can be provided on an integrated circuit. For example, in the book Analysis and Design of Analog Integrated Circuits, 2nd edition, P. Grey et al., John Wiley & Sons, ©1977, 1978, a number of resistor technologies are described including, for example, base-diffused, emitter-diffused, pinched, epitaxial, pinched epitaxial, and thin film resistors. It is not important to the present invention which resistor technology is chosen as long as they have good matching.

The circuit and method of the present invention can, and typically do, form a part of a larger system and/or process. For example, the circuit of the present invention typically forms a part of a larger circuit that is integrated on a "chip" and packaged. The packaged integrated circuit is then made a part of a larger system by attaching it to a printed circuit (PC) board along with other electronic devices, connecting the resultant circuit to power supplies and to other devices and systems. It should therefore be understood for the product that results from the processes of the present invention include the circuit itself, integrated circuit chips including one or more circuits, larger systems (e.g. PC board level systems), products which include such larger systems, etc. It should also be noted that transistors $Q_1$ and $Q_2$ can be located off-chip for a particular application.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A temperature stabilized, constant current source battery charger suitable for charging a fully discharged battery, comprising:

a current based feedback control circuit responsive to small signal changes in a battery charging current wherein the feedback control circuit maintains the battery charging current within a predetermined range of current values at a particular operating temperature;

a temperature compensation circuit coupled from the feedback control circuit that is responsive to a temperature change having a sensing resistor of a given resistor technology coupled from at least one positive temperature coefficient voltage source and at least one negative temperature coefficient current source arranged to provide said sensing resistor with a temperature stabilized control current such that temperature dependencies of the negative temperature coefficient current source substantially countervails the at least one positive temperature coefficient voltage source such that a sense voltage developed by the sensing resistor is substantially constant over a predetermined operating range of temperatures; and a bias resister coupled to the temperature compensation circuit arranged to provide a bias current to the temperature compensation circuit based upon a supply voltage such that the temperature compensation circuit is operative when the battery is fully discharged.

2. A temperature stabilized, constant current source battery charger as recited in claim 1 wherein the positive temperature coefficient current source includes a first transistor having a first transistor base terminal coupled to a second transistor base terminal of a second transistor, wherein the first transistor and the second transistor each have different base-emitter turn-on voltages from the other, and wherein an emitter node of the second transistor is coupled to the sensing resistor.

3. A temperature stabilized, constant current source battery charger as recited in claim 2 wherein the negative temperature coefficient current source includes a negative temperature current source coupled to an emitter terminal of the first transistor.

4. A temperature stabilized, constant current source battery charger as recited in claim 3 wherein the negative temperature current source substantially compensates for a temperature dependent current change generated by the positive temperature coefficient voltage source.

5. A temperature stabilized, constant current source battery charger as recited in claim 4 wherein the sensing current through the sensing resistor is substantially stable over the predetermined operating range of temperatures.

6. A temperature stabilized, constant current source battery charger as recited in claim 5, wherein the feedback control circuit includes a feedback control sensing transistor coupled from the second transistor.

7. A temperature stabilized, constant current source battery charger as recited in claim 6 wherein feedback control sensing transistor responds to a change in the battery charging current.

8. A temperature stabilized, constant current source battery charger as recited in claim 7, wherein the fully discharged battery has an output voltage of approximately 0.0 volts.

9. A method for supplying a temperature independent battery charging current that is used to charge a fully discharged battery having a battery output voltage, comprising:

supplying a charging voltage or a charging current at the battery;

developing a biasing current across a bias resistor based upon a supply voltage;

stabilizing a sensing current through a sensing resistor at a particular temperature using a feedback control circuit;

developing a temperature stabilized control current at the sensing resistor;

applying said temperature stabilized current to said sensing resistor; and developing a control voltage across the sensing resistor based upon said temperature stabilized control current that is essentially independent of temperature dependencies of said control resistor such that the temperature independent battery charging current is supplied to the fully discharged battery.

10. A method as recited in claim 9, further comprising:

supplying a substantially countervailing control current to a positive temperature coefficient current by a negative temperature coefficient current source such that the substantially countervailing control current compensates for a temperature induced current change by the positive temperature coefficient current source over a range of operating temperatures.

11. An apparatus for supplying a temperature independent battery charging current that is used to charge a substantially discharged battery having a battery output voltage, comprising:

means for supplying a charging voltage or a charging current at the battery;

means for developing a biasing current across a bias resistor based upon a supply voltage;

means for stabilizing a sensing current through a sensing resistor at a particular temperature using a feedback control circuit;

means for developing a temperature stabilized control current at the sensing resistor;

means for applying said temperature stabilized current to said sensing resistor; and means for developing a control voltage across the sensing resistor based upon said temperature stabilized control current that is essentially independent of temperature dependencies of said control resistor such that the temperature independent battery charging current is supplied to the fully discharged battery.

12. An apparatus as recited in claim 11, further comprising:

means for supplying a substantially countervailing control current to a positive temperature coefficient current by a negative temperature coefficient current source such that the substantially countervailing control current compensates for a temperature induced current change by the positive temperature coefficient current source over a range of operating temperatures.

* * * * *